United States Patent
Popp et al.

(10) Patent No.: US 9,948,017 B2
(45) Date of Patent: Apr. 17, 2018

(54) DEVICE FOR RECEIVING A DATA CARRIER AND A DATA CARRIER SET FOR ARRANGING IN AN OBJECT

(71) Applicant: Balluff GmbH, Neuhausen a.d.F. (DE)

(72) Inventors: Norbert Popp, Wolfschlugen (DE); Ulrich Ullmann, Filderstadt (DE); Rolf Heussner, Stuttgart (DE)

(73) Assignee: Balluff GmbH, Neuhausen a.d.F. (DE)

( * ) Notice: Subject to any disclaimer, the term of this patent is extended or adjusted under 35 U.S.C. 154(b) by 0 days.

(21) Appl. No.: 15/420,361

(22) Filed: Jan. 31, 2017

(65) Prior Publication Data
US 2017/0222347 A1 Aug. 3, 2017

(30) Foreign Application Priority Data

Feb. 1, 2016  (DE) .................. 20 2016 100 489 U
Dec. 7, 2016  (DE) .................. 20 2016 106 806 U

(51) Int. Cl.
| | |
|---|---|
| *H01R 25/00* | (2006.01) |
| *H01R 13/20* | (2006.01) |
| *H01R 13/18* | (2006.01) |
| *G02B 6/38* | (2006.01) |

(52) U.S. Cl.
CPC ............ *H01R 13/20* (2013.01); *H01R 13/18* (2013.01); *G02B 6/3825* (2013.01)

(58) Field of Classification Search
None
See application file for complete search history.

(56) References Cited

U.S. PATENT DOCUMENTS

| | | | | |
|---|---|---|---|---|
| 6,637,946 B2* | 10/2003 | Cheng | ................. | G02B 6/3825 385/77 |
| 7,997,929 B2* | 8/2011 | Montena | .............. | H01R 9/0524 439/578 |
| 8,376,781 B2* | 2/2013 | Watanabe | ............. | G01J 1/0403 439/620.21 |

FOREIGN PATENT DOCUMENTS

DE  298 20 121 U1  1/1999

OTHER PUBLICATIONS

DIN 60068-2-6, May 1996, 26 pages. (English translation also attached, Edition 7.0, Dec. 2007, 86 pages).
EN 60068-2-27, Mar. 1995, 25 pages. (English translation also attached, Edition 4.0, Feb. 2007, 80 pages).
English translation of Withdrawn IEC 60068-2-29, Edition 2.0, 1987, 34 pages.

* cited by examiner

*Primary Examiner* — Tho D Ta
(74) *Attorney, Agent, or Firm* — Collard & Roe, P.C.

(57) ABSTRACT

A device for receiving a data carrier has a receiving body that has a receiving region with a circular-cylindrical cross-section, wherein the receiving region has a circular opening on one end of the receiving body that corresponds to the cross-section of the receiving region, a data carrier which is arranged at least partially in the receiving region, and a circular-cylindrical fixing pin that is arranged on the other end of the receiving body.

6 Claims, 3 Drawing Sheets

DEVICE FOR RECEIVING A DATA CARRIER AND A DATA CARRIER SET FOR ARRANGING IN AN OBJECT

CROSS REFERENCE TO RELATED APPLICATIONS

Applicant claims priority under 35 U.S.C. § 119 of German Application No. 20 2016 100 489.6 filed Feb. 1, 2016 and German Application No. 20 2016 106 806.1 filed Dec. 7, 2016, the disclosures of which are incorporated by reference.

BACKGROUND OF THE INVENTION

1. Field of the Invention

The present invention relates to a device for receiving a data carrier. Furthermore, the present invention relates to a data carrier set that, along with the device, contains an expanding rivet in which the device can be arranged. The data carrier set can be fixed in an object, in particular in an engine block.

2. Description of the Related Art

It is not always possible in production processes to use a workpiece carrier. If information is to be carried along directly to an object nevertheless, such as to an engine block for example, then it is imperative to be able to fix a data carrier, which enables a wireless information transfer, to the object in an uncomplicated manner and then be able to detach it again. This can be achieved by means of a data carrier screw. A data carrier screw consists of a receiving body, in which the data carrier is arranged, and a screw shaft, which can be screwed into a thread in the engine block. In order to provide this thread, a conical bore has to be drilled into the engine block and then a thread has to be produced by means of thread cutting. The subsequent screwing-in process usually takes place by using a pneumatic impact screwdriver.

SUMMARY OF THE INVENTION

The object of the present invention is to provide a device for receiving the data carrier which can be fixed to an object, such as to an engine block for example, without a screw shaft. A further object of the invention is providing means to fix the device on an object and to modify an object in such a way that it can be provided with a data carrier by means of the device.

This object is solved in one aspect of the invention by a device for receiving a data carrier. This has a receiving body that has a receiving region with a circular-cylindrical cross-section for the data carrier. The receiving region has a circular opening on one end of the receiving body. The opening corresponds to the cross-section of the receiving region. A data carrier is arranged at least partially in the receiving region. Furthermore, the device has a circular-cylindrical fixing pin that is arranged on the other end of the receiving body. The outer surface of the fixing pin is smooth. This means it has, in particular, no external thread. On its end facing away from the receiving body, the fixing pin preferably has a conical region. This enables it to insert the fixing pin into an expanding rivet and then remove it again without damaging the expanding rivet in the process.

The receiving body preferably has several engaging regions in which a tool can engage, such that the device can be easily placed on an object, such as an engine block in particular.

The data carrier is preferably circular-cylindrically shaped, wherein its cross-section corresponds to the cross-section of the receiving region. This enables it to insert the data carrier into the receiving region in such a way that an optimal space utilisation in the receiving body takes place.

A data carrier can protrude beyond the receiving region. The receiving region thus only serves for the connection between the data carrier and the receiving body. It is even preferred that the data carrier protrudes beyond the receiving region. By doing so, a wireless data exchange between the data carrier and a reading device is not impaired by the material of the receiving body.

For the purpose of the invention, not only a data-storing element is to be understood by a data carrier, but also an assembly group which can be arranged in the receiving region. Along with the data-storing element, this assembly group includes, in particular, an element for wireless data exchange, such as an RFID antenna (Radio Frequency Identification) for example, and a housing which protects the electronic components of the data carrier from contaminants and damages. The housing is, in particular, circular-cylindrically shaped and has an external diameter that corresponds to the internal diameter of the receiving region. The height of the housing is preferably greater than the height of the receiving region, such that the housing protrudes beyond the receiving region. Thus, it is preferred that the element for the wireless communication is arranged in the region of the housing that is not surrounded by the receiving region such that the wireless communication is not impaired by the material of the receiving body.

While the housing preferably consists of a non-metallic material which does not impair the spread of radio waves, the receiving body and the fixing pin preferably consist of a metal in order to guarantee high mechanical resilience of the device. For this purpose, it is particular preferred that the receiving body and the fixing pin are produced in one piece from the same metal.

In a further aspect of the invention, the object is solved by a data carrier set. This comprises a device for receiving a data carrier according to the invention and an expanding rivet for fixing the device. Together, these two components of the data carrier set are suitable for applying a data carrier on an object which has a conical bore without an internal thread. The expanding rivet has a base body having a continuous opening along the longitudinal axis of the expanding rivet. The cross-section of the continuous opening corresponds to the cross-section of the fixing pin of the device. Furthermore, the expanding rivet has several spring elements that are arranged on the base body in such a way that they are angled away in relation to the longitudinal axis. This angling away takes place in particular in such a way that the ends of the spring elements which are arranged on the base body are closer to the longitudinal axis than those ends that are facing away from the longitudinal axis. By doing so, the expanding rivet is prevented from falling out of a conical opening. The spring elements are able to be deflected in such a way that they run in parallel to the longitudinal axis and contact the fixing pin when it is guided through the continuous opening of the base body. The expanding rivet can be inserted into a conical opening without an internal thread. If the fixing pin of the device is subsequently guided through the continuous opening of the expanding rivet, then it deflects the spring elements in such a way that they run in parallel to the longitudinal axis and thus also in parallel to the fixing pin and are squeezed in between the fixing pin and the internal walls of the bore. This allows for a secure fixing of the device in the bore.

All spring elements preferably have the same length, such that they enclose the fixing pin from all sides in equal measure.

Furthermore, it is preferred that the spring elements have outer surfaces which together form an interrupted circular cone when the spring elements are deflected in parallel to the longitudinal axis. By doing so, they form a surface that abuts on the internal wall of the bore, almost without gaps. This surface is only interrupted where a free space between two adjacent spring elements remains open. These free spaces are required in order to facilitate the spring of the spring elements from their angled-away position into their position running in parallel to the longitudinal axis.

The length of the fixing pin of the device preferably corresponds at least to the length of the spring elements. Thus, it is ensured that the total length of the spring elements can be used to fix the fixing pin.

In yet another aspect of the invention, the object is solved by an object, in particular by an engine block, which has a conical bore in which the expanding rivet of the data carrier set is arranged. The diameter of the bore is smaller than the external diameter of an interrupted circular cone, which is formed from the spring elements of the expanding rivet when these are deflected in parallel to its longitudinal axis. By doing so it is achieved that, when inserting the fixing pin into the expanding rivet, the spring elements are squeezed in between the internal wall of the conical bore and the fixing pin. In doing so, they exert a force on the fixing pin which holds it in the conical bore when the device according to the invention is arranged in the expanding rivet.

BRIEF DESCRIPTION OF THE DRAWINGS

Exemplary embodiments of the invention are depicted in the drawings and are explained in more detail in the following description.

DETAILED DESCRIPTION OF PREFERRED EMBODIMENTS

Figure 1:
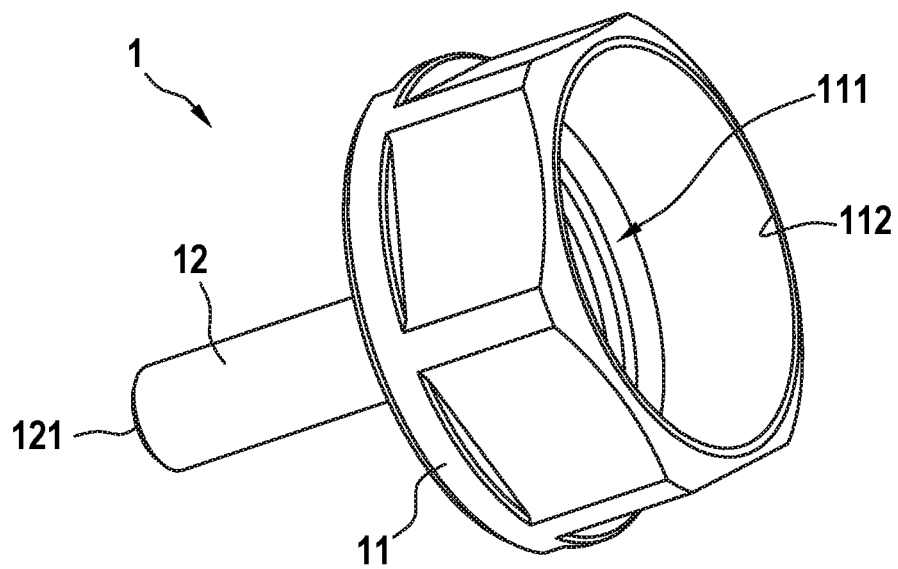
FIG. 1 shows an isometric depiction of a device for receiving a data carrier according to an exemplary embodiment of the invention.

A device 1 for receiving a data carrier according to one exemplary embodiment of the invention is depicted in FIG. 1. It consists of a receiving body 11 and a fixing pin 12, which are formed in one piece made of steel. The receiving body 11 is circular-cylindrically shaped and has six engaging recesses on its peripheral surface for a tool. The receiving body 11 is partially hollow, such that it has a circular-cylindrical receiving region 111 which is accessible from one end of the receiving body 11 by means of a circular opening 112. The other end of the receiving region 111 is closed. The circular-cylindrical fixing pin 12 is arranged in the middle of the closed end. In the present case, this has a length of 14 mm and a diameter of 4 mm. Its end facing away from the receiving body 11 has a conical region 121.

Figure 2:
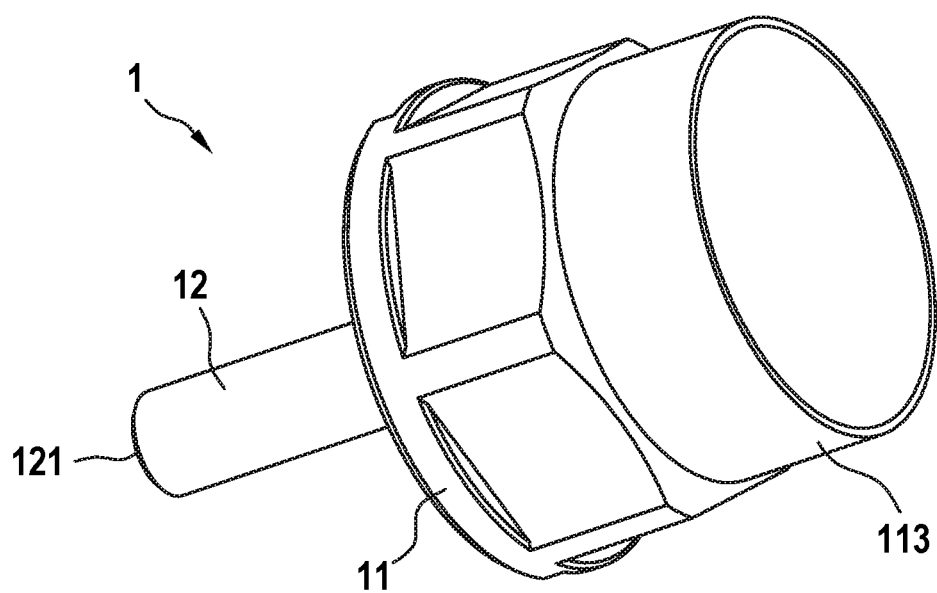
FIG. 2 shows an isometric depiction of the device according to FIG. 1, in which a data carrier is arranged.

As shown in FIG. 2, the data carrier 113 is arranged in the receiving region 111 in such a way that it fills this up and protrudes beyond it. The data carrier has a plastic housing, the external diameter of which corresponds to the internal diameter of the receiving region 111 and the opening 112. A data-storing microchip and an RFID antenna are arranged inside this housing in such a way that the RFID antenna is located outside the receiving region 111.

Figure 3:
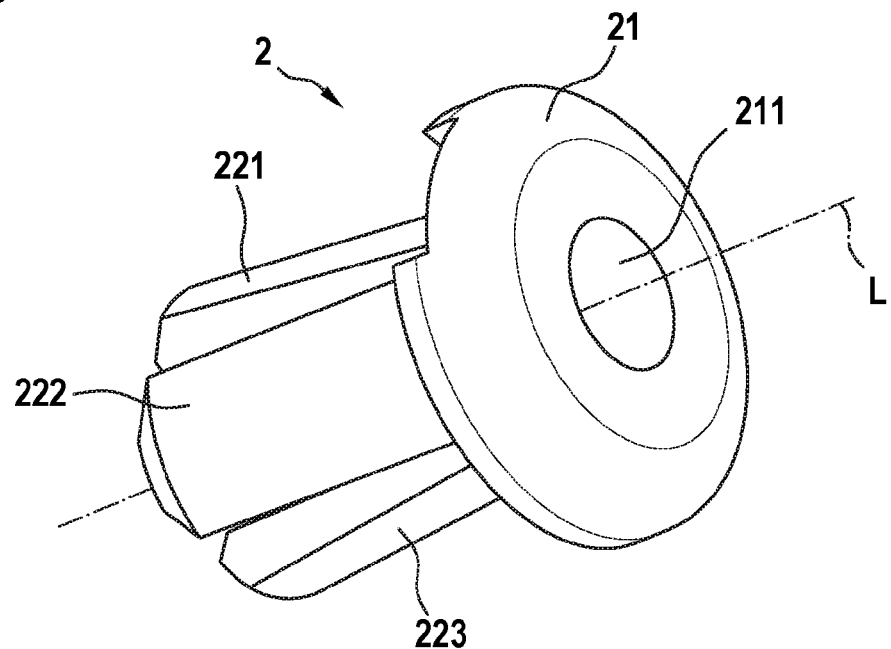
FIG. 3 shows an isometric depiction of an expanding rivet of a data carrier set according to an exemplary embodiment of the invention.
Figure 4:
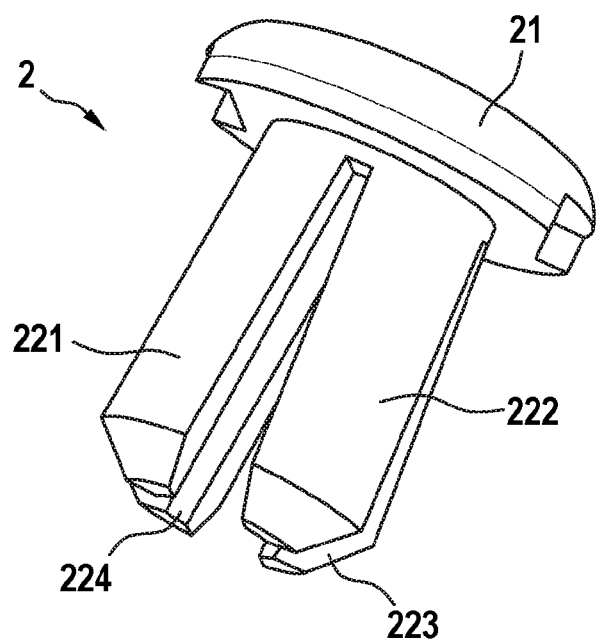
FIG. 4 shows a different isometric depiction of the expanding rivet according to FIG. 3.

An expanding rivet 2 of a data carrier set according to one exemplary embodiment of the invention, which serves to fix the device 1 in a conical bore, is depicted in FIGS. 3 and 4. Expanding rivets are principally known, for example, from DE 298 20 121 U1. The expanding rivet used in the data carrier set has a disc-shaped base body 21. An opening 211 goes straight through the base body 21 along the longitudinal axis L of the expanding rivet. The internal diameter of this continuous opening 211 is 4 mm and thus corresponds to external diameter of the fixing pin 12. Four spring elements 221, 222, 223, 224 are arranged on one side of the base body 21 in such a way around the continuous opening 211 that they are angled away from the longitudinal axis L from the continuous opening 211. If the spring elements 221, 222, 223, 224 are pressed together in such a way that they run in parallel to the longitudinal axis L, then they form a channel interrupted on its internal walls, the diameter of which corresponds to the diameter of the continuous opening 211. The external walls of the spring elements 221, 222, 223, 224 thus form an interrupted circular cone, the external diameter of which is 7 mm. The interruptions, both of the channel and of the circular cone, thus take place through slots that, in each case, separate two of the spring elements 221, 222, 223, 224 from each other.

Figure 5:
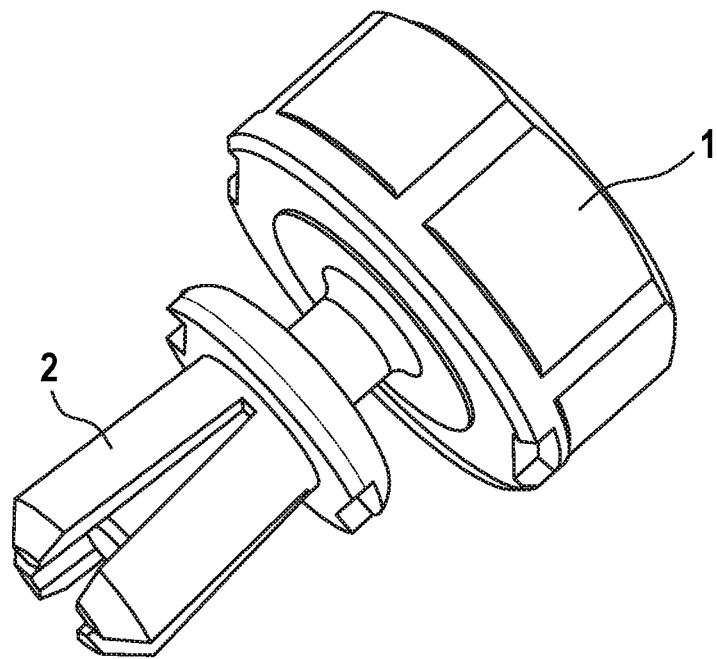
FIG. 5 shows an isometric depiction of the device according to FIG. 1, the fixing pin of which is arranged in an expanding rivet according to FIGS. 3 and 4.

In FIG. 5, it is depicted how the device 1 can be inserted into the expanding rivet 2 as part of the data carrier set. Since the spring elements 221, 222, 223, 224 of the expanding rivet are still in their initial position here, fixing the device 1 does not yet take place. This arrangement of the data carrier set only serves for illustration. To fix the device 1 on the engine block, it is rather provided that, initially, the expanding rivet 2 is inserted into a conical bore of the engine block and subsequently the fixing pin 12 of the device 1 is introduced into the expanding rivet 2.

Figure 6:
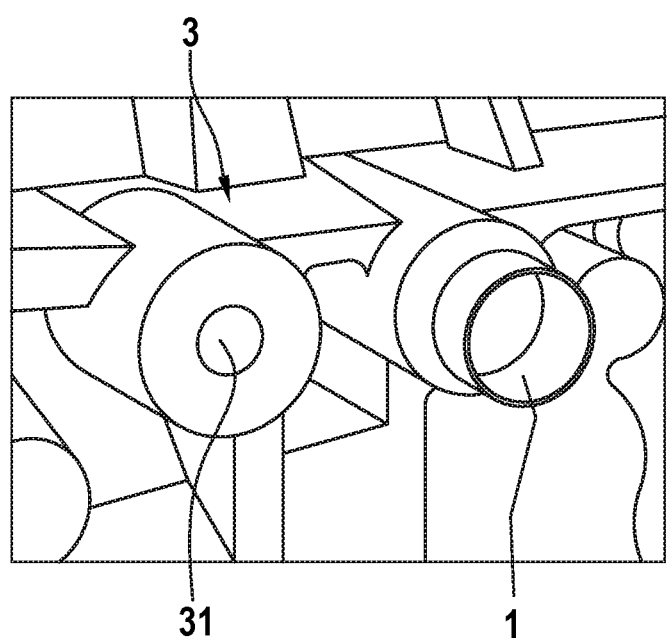
FIG. 6 shows an engine block which, in one exemplary embodiment of the invention, is equipped with a device for receiving a data carrier.

This is depicted in FIG. 6. The object 3, embodied here as an engine block, has two conical bores 31 with an internal diameter of 6.6 mm in each case. Initially, an expanding rivet 2 was arranged in one of these bores and then the fixing pin 12 of a device 1 was inserted into this through the continuous opening 211 of the expanding rivet. Since the internal diameter of the conical bore 31 is smaller than the external diameter of the circular cone, which is formed from the spring elements 221, 222, 223, 224 of the expanding rivet 2, the spring elements 221, 222, 223, 224 are thus squeezed in between the fixing pin 12 and the internal walls of the conical bore 31. Thus, they exert a force on the fixing pin 12 which holds this in the expanding rivet 2 and thus on the engine block.

It was determined in a tensile test that an attraction force of 139 N was necessary in order to pull the device 1 out of the expanding rivet 2 again. By doing so, the expanding rivet remained intact.

In order to check whether the mechanical strength of the device 1 and the expanding rivet 2 is sufficient in order to withstand the load to which they are subjected during a production process when being arranged on an engine block, they were subjected to a sine duration test according to DIN 60068-2-6 standard in a frequency range of 10 to 2000 Hz at a checking level D/A of 3 mm pp/20 g and a transfer frequency of 57.55 Hz for 20 cycles (40 sweeps). Furthermore, they underwent two shock tests according to EN 60068-2-27 standard with a half sine curve shape and 20% compensation pulses with 25 positive pulses and 25 negative pulses. In the first shock test, the peak acceleration was 50 g and the pulse length was 11 ms. In the second shock test, the peak acceleration was 100 g and the pulse length was 6 ms. Finally, the device 1 and the expanding rivet 2 underwent a shock duration test according to EN 60068-2-29 standard with a half sine curve shape and 20% compensation pulses. Here, the peak acceleration was 100 g, the pulse length 2 ms and 4000 positive and 4000 negative pulses were applied. After all tests, the device 1 and the expanding rivet 2 could be assessed as in order.

Although only a few embodiments of the present invention have been shown and described, it is to be understood that many changes and modifications may be made thereunto without departing from the spirit and scope of the invention.

What is claimed is:

1. Data carrier set, comprising a device for receiving a data carrier and an expanding rivet,
    wherein the device comprises:
        a receiving body that has a receiving region with a circular-cylindrical cross-section, wherein the receiving region has a circular opening on one end of the receiving body that corresponds to the cross-section of the receiving region;
        a data carrier which is arranged at least partially in the receiving region; and
        a circular-cylindrical fixing pin that is arranged on the other end of the receiving body;
    wherein the expanding rivet comprises:
        a base body having a continuous opening along the longitudinal axis of the expanding rivet, the cross-section of said opening corresponding to the cross-section of the fixing pin of the device; and
        several spring elements that are arranged on the base body in such a way that they are angled away in relation to the longitudinal axis;
    wherein the spring elements are able to be deflected in such a way that they run in parallel to the longitudinal axis and contact the fixing pin when it is guided through the continuous opening of the base body.

2. Data carrier set according to claim 1, wherein the fixing pin has a conical region on its end facing away from the receiving region.

3. Data carrier set according to claim 1, wherein all spring elements have the same length.

4. Data carrier set according to claim 1, wherein the spring elements have outer surfaces which together form an interrupted circular cone when the spring elements are deflected in parallel to the longitudinal axis.

5. Data carrier set according to claim 1, wherein the length of the fixing pin corresponds at least to the length of the spring elements.

6. Object, having a conical bore in which the expanding rivet of a data carrier set according to claim 1 is arranged, wherein the diameter of the bore is smaller than the external diameter of an interrupted circular cone which is formed by the spring elements of the expanding rivet when these are deflected in parallel to its longitudinal axis, and wherein the device is arranged in the expanding rivet.

* * * * *